US008423045B2

(12) United States Patent
Parameswar (10) Patent No.: US 8,423,045 B2
(45) Date of Patent: Apr. 16, 2013

(54) LOCATION-BASED PRESENCE AUTOMATION

(75) Inventor: Sriram Parameswar, Allen, TX (US)

(73) Assignee: Avaya Inc., Basking Ridge, NJ (US)

( * ) Notice: Subject to any disclaimer, the term of this patent is extended or adjusted under 35 U.S.C. 154(b) by 214 days.

(21) Appl. No.: 11/233,875

(22) Filed: Sep. 23, 2005

(65) Prior Publication Data

US 2007/0069888 A1  Mar. 29, 2007

(51) Int. Cl.
*H04W 24/00* (2009.01)

(52) U.S. Cl.
USPC .................................. 455/456.3; 455/456.6

(58) Field of Classification Search .... 455/456.1–456.6, 455/457
See application file for complete search history.

(56) References Cited

U.S. PATENT DOCUMENTS

| 6,832,251 | B1 | 12/2004 | Gelvin et al. | |
|---|---|---|---|---|
| 2003/0030569 | A1* | 2/2003 | Ulrich et al. | 340/825.49 |
| 2003/0069806 | A1 | 4/2003 | Konomi | |
| 2004/0097243 | A1* | 5/2004 | Zellner et al. | 455/456.1 |
| 2005/0070297 | A1* | 3/2005 | Caspi et al. | 455/456.1 |
| 2005/0145688 | A1* | 7/2005 | Milenkovic et al. | 235/375 |
| 2006/0099963 | A1* | 5/2006 | Stephens | 455/456.3 |
| 2007/0015517 | A1* | 1/2007 | Casey | 455/456.1 |
| 2008/0280624 | A1* | 11/2008 | Wrappe | 455/456.1 |

FOREIGN PATENT DOCUMENTS

| EP | 1191448 A1 | 3/2002 |
|---|---|---|
| WO | WO03003694 A2 | 1/2003 |
| WO | WO2005001669 A2 | 1/2005 |

OTHER PUBLICATIONS

International Search Report for PCT/IB2006/002567 mailed Feb. 21, 2007.

\* cited by examiner

*Primary Examiner* — Steven Lim
(74) *Attorney, Agent, or Firm* — Withrow & Terranova, PLLC (57) ABSTRACT

The present invention provides for an improved presence system, which can automatically and unobtrusively factor in the location of a person being monitored when creating presence information for dissemination to subscribers. Presence tags can be distributed at different locations, which may bear on the relative availability of the monitored person for communications. A mobile terminal associated with the monitored person is configured to automatically obtain tag information from the presence tags and deliver location-based state information to the presence server without human interaction. The presence server will process the location-based state information and any other applicable state information to create presence information for the person being monitored, and then deliver the presence information to subscribers.

24 Claims, 6 Drawing Sheets

LOCATION-BASED PRESENCE AUTOMATION

FIELD OF THE INVENTION

The present invention relates to providing presence information, and in particular to controlling the delivery of presence information in light of a user's location in an automated fashion.

BACKGROUND OF THE INVENTION

Given the rapid expansion of mobile communications along with the pervasiveness of email and instant messaging, determining the right method or time to contact someone often proves difficult. Many people are associated with numerous telephone numbers associated with fixed and mobile terminals, email addresses, instant messaging identifiers, and the like. Trying to contact such people often leads to leaving one or more voicemails and perhaps sending email or instant messaging messages prior to making contact. Further, trading numerous messages or voicemails prior to finally connecting with one another is commonplace.

Presence systems have been developed to address the difficulty in determining if someone is available to communicate, and perhaps how best to communicate with that person when she is available. In general, presence systems monitor state information from one or more devices or networks associated with a particular person, and process the state information to create presence information bearing on the relative availability of that particular person. The presence information is then sent to those subscribers interested in knowing the relative availability of the particular person. The state information generally bears on a person's physical presence or activity with respect to a certain device.

Unfortunately, the relative availability of a person for communications is often dictated by her location, and in particular, the nature of the location. For example, an office environment has various locations in which communications are both desirable and undesirable. The person may not want to receive communications while they are in a conference room, a superior's office, a restroom, a designated quiet area, or an elevator for any number of reasons. There are other types of locations where receiving communications, or at least certain types of communications, is generally desirable, such as when the person is in her office or in a subordinate's office. Outside of the office, there are locations such as restaurants, theaters, churches, and hospitals where receiving communications, or at least certain types of communications, is also undesirable.

Accordingly, a person's relative availability to receive communications may change from minute to minute based on her location. Although attempts are being made to automate presence tracking, current presence systems are simply unable to readily take into consideration such location-based changes without requiring the person to provide some form of manual input. For example, when a presence system is configured to monitor the state of the person's mobile terminal, the person may need to turn her mobile telephone off when entering a conference room, restaurant, restroom, or the like, and then turn it back on upon leaving. Given the frequency with which the person may enter and leave the various locations, updating the presence system becomes impractical. Such impracticality is unfortunate because the concept of presence-controlled communications is very desirable, yet automation and resolution, especially with respect to location, is necessary to fully take advantage of presence information.

Accordingly, there is a need for a technique to further automate the acquisition of location-based state information to provide an improved system for delivering presence information. There is a further need for a cost effective and efficient technique to automatically determine a person's location and provide location-based state information to a presence system based on the person's location. There is yet a further need to integrate location-based state information with other types of state information to provide an improved presence system.

SUMMARY OF THE INVENTION

The present invention provides for an improved presence system, which can automatically and unobtrusively factor in the location of a person being monitored when creating presence information for dissemination to subscribers. Presence tags can be distributed at different locations, which may bear on the relative availability of the monitored person for communications. A mobile terminal associated with the monitored person is configured to obtain tag information from the presence tags and deliver location-based state information to the presence server. The location-based state information may include the tag information or a location-based state determined based on the tag information. The tag information may simply be a tag identification or other type of information bearing on a particular location or a type of location where the presence tag is located. Accordingly, certain embodiments of the present invention will allow the mobile terminal or the presence server to actually use the tag identification to determine an appropriate state to apply to the presence rules associated with the monitored person. These presence rules will then dictate the presence information to be delivered to the subscribers. With the present invention, the mobile terminal can automatically retrieve the tag information from the presence tags and provide the appropriate location-based state information to the presence server without requiring any input by the monitored person. As such, valuable location-based state information can be delivered to the presence server in real time and in an efficient manner.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
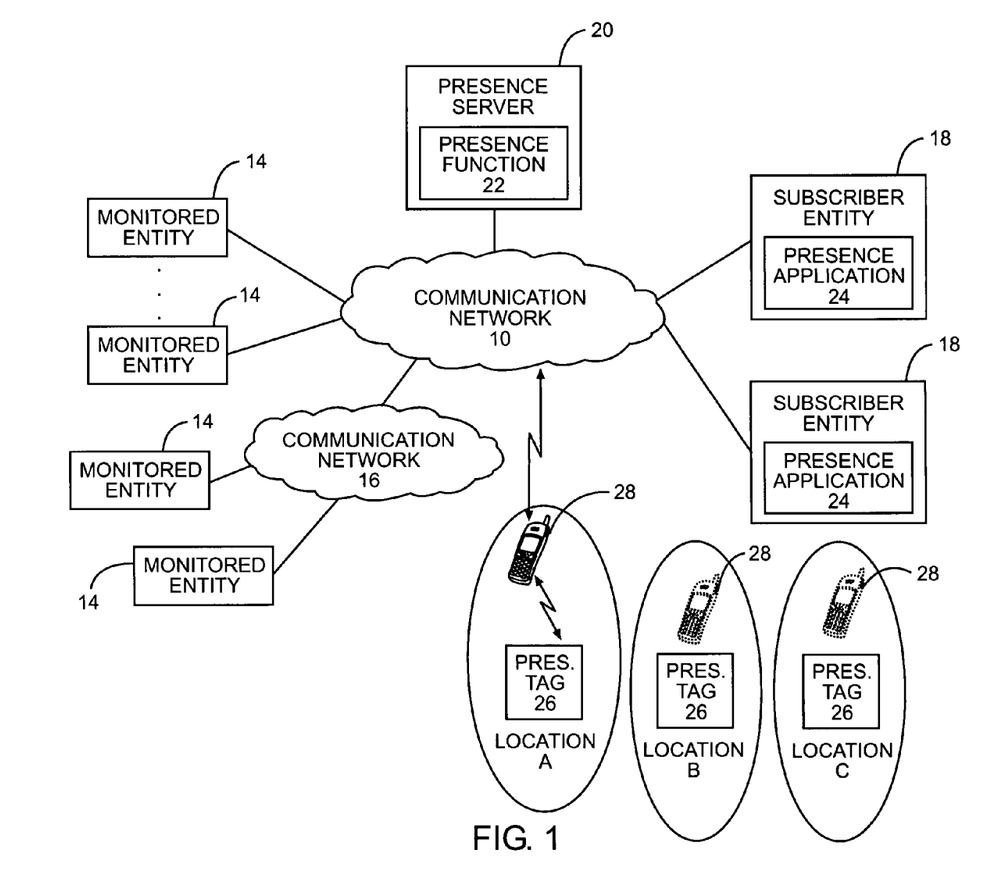
FIG. 1 is a block representation of a communication environment according to one embodiment of the present invention.

The present invention addresses the shortcomings of existing presence systems by providing an effective and efficient technique for obtaining and providing location-based state information to a presence system in an automatic fashion. An exemplary presence system according to one embodiment of the present invention is illustrated in FIG. 1. A communication network 10 is configured to support communications with any number of monitored entities 14, directly or indirectly through another communication network 16, as well as supporting communications with various subscriber entities 18 to which presence information is delivered. The monitored entities 14 are generally those with which a person to be monitored will directly or indirectly interact, and will provide state information bearing on the person's activity, presence, or location. A presence server 20 is provided and includes a presence function 22, which processes the state information to create presence information to provide to the subscriber entities 18. The subscriber entities 18 may include presence applications 24, which process the presence information and operate to control the associated subscriber entity 18 as necessary to provide presence alerts to the subscriber based on the presence information. Accordingly, as state information for a monitored person changes, up-to-date presence information is provided to the subscriber entities 18. The presence information will aid the subscribers associated with subscriber entities 18 in deciding when or how to communicate with the monitored person.

In an effort to make presence information more accurate and helpful, the present invention incorporates presence tags 26, which are placed in a variety of different locations A, B, and C. The presence tags 26 are active or passive devices that are capable of supporting local wireless communications with a user's mobile terminal 28. In general, the presence tags 26 will transmit tag information for the mobile terminal 28 to receive. The tag information may simply be a tag identification, which has been associated with a particular location or type of location by the mobile terminal 28, the presence server 20, or other accessible entity. Alternatively, the tag information may actually identify a particular location or type of location, and if appropriate provide other information on which presence decisions may be based. The mobile terminal 28 will then send location-based state information to the presence system for processing based on the tag information.

The mobile terminal 28 may simply forward the tag information as the location-based state information to the presence server 20, or it may process the tag information to create the location-based state information for transmission to the presence server 20. Regardless of whether the mobile terminal 28 processes the tag information, the location-based state information will provide information sufficient to alert the presence server 20 that the mobile terminal 28 is at a particular location or a certain type of location. The presence server 20 can then process the location-based presence information, if warranted, to create presence information to deliver to the presence applications 24 of the subscriber entities 18.

Locations A, B, and C may represent any type and combination of locations, such as a conference rooms, workplace offices, work or public restrooms, designated quiet areas, elevators, restaurants, malls, theaters, churches, and hospitals. Regardless of type, these locations A, B, and C in which presence tags 26 are located represent locations likely to have presence implications for a particular user or users in general. For example, certain presence tags 26 may be specifically placed for a particular user, such as when a user places a presence tag 26 in her office. Other presence tags 26 may be placed for the general public or select groups of users, such as when a service provider, sponsor, or company places presence tags 26 in restrooms, restaurants, theaters, or other enterprise or commercial locations.

Since the state information provided to the presence server 20 includes state information bearing on a particular location or type of location, the rules established by the monitored person for creating the presence information will access valuable location-related information. The mobile terminal 28 may be configured to quickly recognize the presence of a presence tag 26, retrieve the tag information, and send location-based state information to the presence server 20 in real time. As such, the new location-based state information can be immediately provided to the presence server 20 as the monitored person moves from one location to another or in and out of presence-related locations. If a presence tag 26 is located in a conference room and the tag information or related location-based state information corresponds to a location or state in which calls to the user should not be made, the presence server 20 will be able to immediately provide appropriate presence information to the subscriber entities 18. The presence information can be updated when the monitored person leaves the conference room and the mobile terminal 28 recognizes that the conference room presence tag 26 is no longer within communication range. The monitored user may place a presence tag 26 in his or her office wherein, barring other presence states to the contrary, communications are welcome when the mobile terminal 28 is within communication range of the office presence tag 26. Similar arrangements can be provided for any public, private, enterprise, or commercial locations.

In addition to handling state and presence information, the primary responsibility of the communication network 10 is to facilitate communications among various communication terminals, including the mobile terminal 28, or between a communication terminal and another network entity, such as an application server (not shown). Notably, the monitored entities 14 and the subscriber entities 18 may take the form of a communication terminal, which may be embodied by mobile telephones, personal digital assistants, circuit-switched or packet-based telephones, personal computers, or other communication devices.

The local wireless communications between the presence tag 26 and the mobile terminal 28 may be supported by any number of short range communication techniques, such as those incorporated in passive or active transponder or radio frequency identification (RFID) systems, Bluetooth systems, and IEEE 802.11 wireless local area network systems. In passive transponder or RFID systems, the mobile terminal 28 will transmit signals sufficient to power the presence tags 26, which will transmit the tag information for the mobile terminal 28 to receive. As described further below, the mobile terminal 28 is capable of providing wireless communications with the communication network 10 through an appropriate access network or access point using virtually any type of wireless communications, including cellular and wireless local area network techniques. Local wireless communications with the presence tags 26 are provided along with or in addition to the other wireless communications used to support communications with the communication network 10 and remote terminals.

Figure 2:
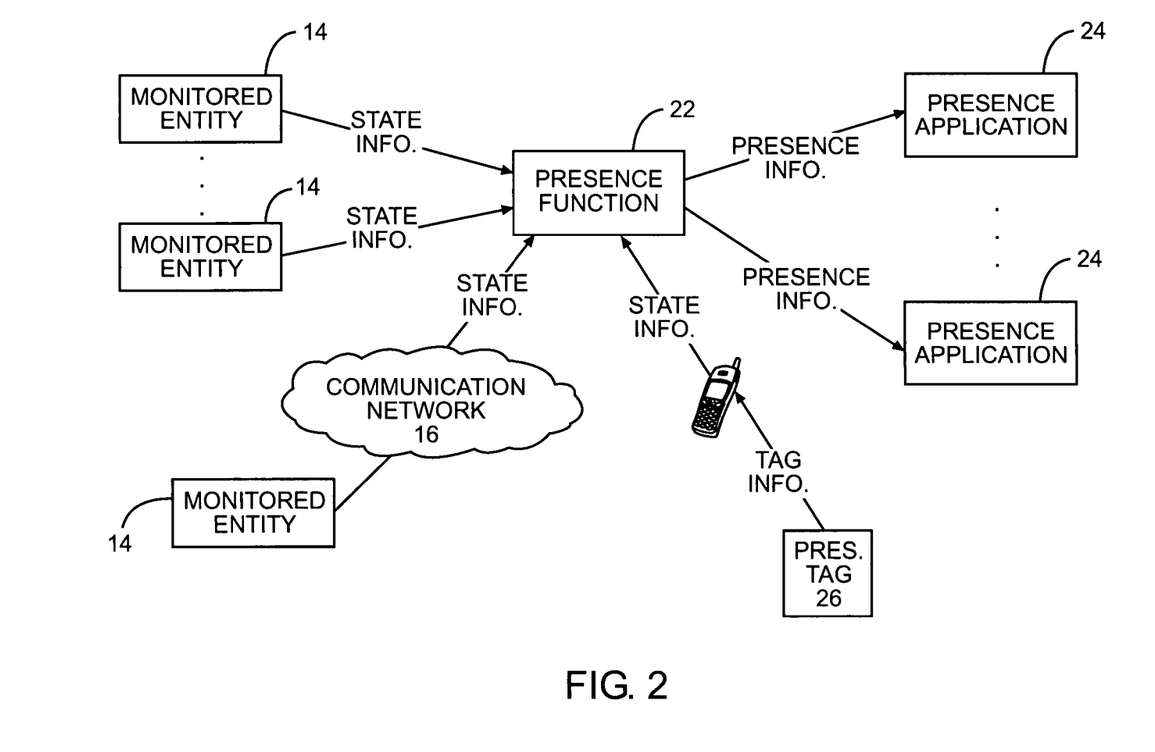
FIG. 2 illustrates a process flow according to one embodiment of the present invention.

With reference to FIG. 2, the basic flow for presence processing is illustrated. In operation, the monitored entities 14 will recognize certain states or state changes in light of a monitored person's interaction, use, or physical presence. For the presence tags 26, the mobile terminals 28 will receive the tag information for the presence tags 26 and provide the corresponding location-based state information. The monitored entity 14, which includes the mobile terminal 28, will provide regular or location-based state information to the presence function 22 as locations or states change, on a periodic basis, or upon request from the presence function 22. Notably, the communication network 16 may actually generate the state information in light of certain interactions with the monitored entity 14, or may simply pass state information from the monitored entity 14 to the presence function 22. Regardless of how the state information is received, the state information for a monitored person is processed in light of defined presence rules and the state information to create presence information for the monitored person. Presence information is then sent to subscribing presence applications 24. The presence information may be provided to the presence applications 24 when the presence information changes, on a periodic basis, or upon request from the presence application 24.

Figure 3:
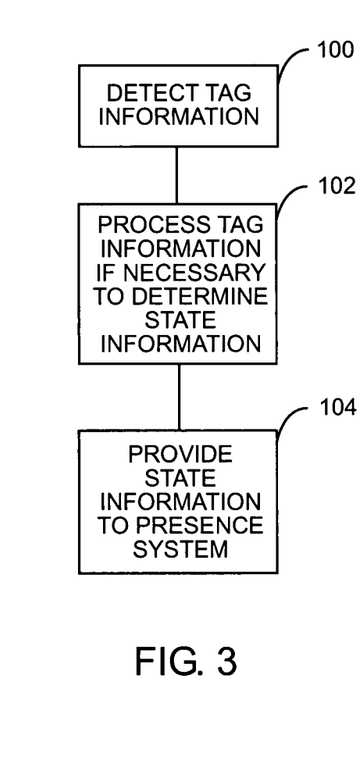
FIG. 3 is a flow diagram providing basic operation of a mobile terminal gathering tag information and providing location-based state information according to one embodiment of the present invention.

Turning now to FIGS. 3 through 6, flow diagrams are provided for various aspects of the presence operation. With particular reference to FIG. 3, a flow diagram is provided from the perspective of the mobile terminal 28 as it obtains tag information and delivers location-based state information. Initially, the mobile terminal 28 will receive tag information from a presence tag 26 within local wireless communication range (step 100). The presence tag 26 may be configured to constantly or systematically transmit the tag information or an initiation signal capable of being received by the mobile terminal 28. The mobile terminal 28 may either receive the tag information or enter into communications with the presence tag 26 to obtain the tag information. Alternatively, the mobile terminal 28 may constantly or systematically transmit a signal configured to activate or otherwise initiate communications with the presence tag 26, which will immediately or ultimately transmit the tag information for receipt by the mobile terminal 28. Upon receipt, the mobile terminal 28 will process the tag information, if necessary, to provide the location-based state information (step 102).

In one embodiment, the location-based state information may be the tag information. In another embodiment, the tag information may be used to determine location-based state information specially configured for processing by the presence server 20. For example, the tag information may be processed by the mobile terminal 28 to determine a particular state, such as busy, available, temporarily unavailable, or the like, which can be readily used by the presence server 20. If the tag information is simply forwarded to the presence server 20 as the location-based state information, the presence server 20 may need to interpret the tag information. In yet another embodiment, the tag information simply provides a particular state, such as busy or available. Once the location-based state information is generated, it is provided to the presence server 20 via any available communication technique directly or indirectly via the communication network 10 (step 104). Notably, the mobile terminal 28 may provide other state information in addition to that derived from a presence tag 26. This additional state information may relate to the monitored user using the mobile terminal 28 for a communication session, silencing the mobile terminal 28, and the like. The presence server 20 may use various types of state information from various devices to determine the presence information ultimately provided to the subscriber entities 18.

Figure 4:
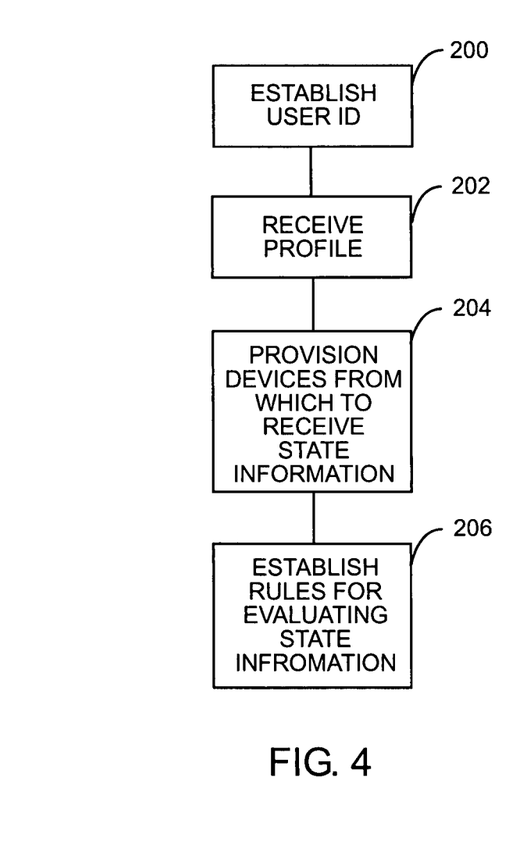
FIG. 4 is a flow diagram outlining a provisioning process according to one embodiment of the present invention.

An exemplary process for initializing a presence function 22 of the presence server 20 to retrieve state information and disseminate presence information is outlined in FIG. 4. Initially, the monitored person may establish an identification for the presence service provided by the integrated presence server 20 (step 200). The presence server 20 will then receive a profile for the monitored person (step 202). Based on the profile, the presence server 20 is provisioned to receive state information, including location-based state information, from the monitored entities 14, including the mobile terminal 28 (step 204). Preferably, the presence function is configured to receive the state information from the monitored entities 14 and the monitored entities 14 are configured to provide the state information. The presence tags 26 may need to be configured in addition to being placed in appropriate locations. Alternatively, the mobile terminal 28 or presence function 22 may need to be configured to properly respond to a simple tag identification. For example, either the mobile terminal 28 or the presence function 22 may be able to respond to certain tag information to determine an appropriate location-based state or like presence input.

Next, the rules for evaluating the state information are established at the presence function 22 based on the profile (step 206). At this point, the presence function 22 is configured for the monitored entity. The rules typically define how to evaluate the state information and deliver the resultant presence information. The monitored person may use the profile to establish rules to control how they should be contacted based on the state of one or more associated devices.

Those skilled in the art will recognize limitless variations in profile and rule constructions for evaluating state information and generating presence information to send to subscribing subscriber entities 18. Further, any combination of current and past state information may be used to determine the presence information. Preferably, the presence information is automatically updated, if necessary, when state changes are detected. Depending on the presence rules, a state change from a given monitored entity 14 may or may not impact the presence information. If the presence information does not change, then there may not be a need to update the subscribing subscriber entities 18.

Figure 5:
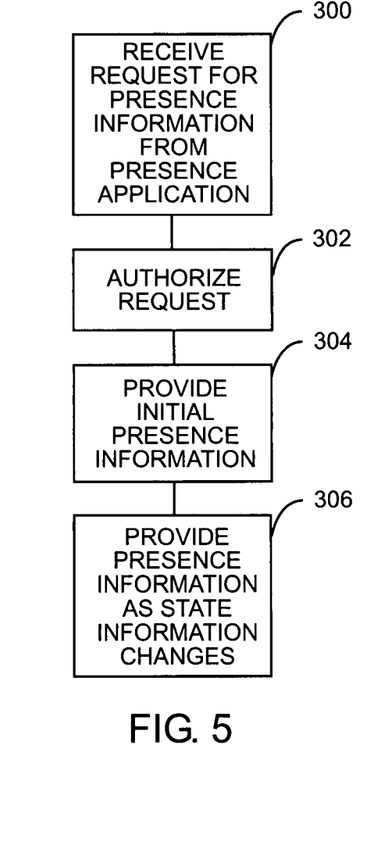
FIG. 5 is a flow diagram outlining overall operation of a presence system according to one embodiment of the present invention.

FIG. 5 provides an exemplary process for subscribing to presence updates for a monitored person through the presence server 20. Initially, a subscriber, via a subscriber entity 18, will send a request to subscribe to the presence server 20. The presence function 22 will receive the request for presence information from the subscriber entity 18 (step 300). The presence function 22 will authorize the request (step 302), and, if authorized, provide initial presence information to the subscribing subscriber entity 18 (step 304). The initial presence information may be default presence information or that based on current state information as evaluated by the rules. Once subscribed, the presence server 20 will provide presence information to the subscriber entities 18 as state information from the monitored entities 14 change in a manner warranting a presence update (step 306).

Figure 6:
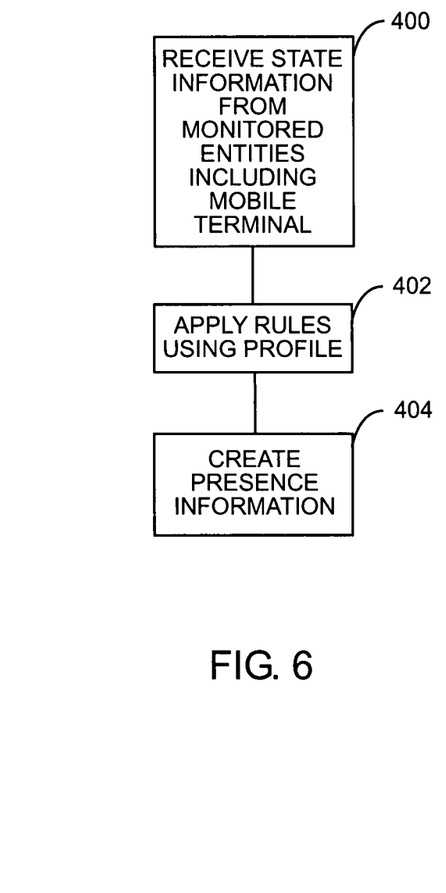
FIG. 6 is a flow diagram outlining the processing of state information according to one embodiment of the present invention.

FIG. 6 illustrates an exemplary process for evaluating state information from the monitored entities 14, including the mobile terminal 28. The presence server 20 continuously receives state information from the applicable monitored entities 14 (step 400) and applies the rules for the monitored person based on her profile (step 402). Notably, the subscriber entities 18 or subscriber associated therewith can also provide a profile to configure or otherwise filter delivery of presence information for the monitored person. Finally, the presence application 22 will evaluate the state changes and create presence information, if necessary, to send to the subscriber entities 18 (step 404).

Accordingly, the present invention automatically receives state information, including location-based state information, from interactions with various devices and evaluates the state information with a rules-based presence system that may take into account relatively static preferences supplied directly by the monitored person wishing to project an indication of presence. Those skilled in the art will recognize that manually provided state information may be used in combination with those initiated from naturally occurring interactions as well as those influenced by the monitored person being in a specific location or type of location.

Although many communication protocols may be used to facilitate communications, including delivery of state and presence information between the various devices, the Session Initiation Protocol (SIP) or the SIP for Instant Messaging and Presence Leveraging Extensions (SIMPLE) protocol is implemented in one embodiment of the present invention. The specification for SIP is provided in the Internet Engineering Task Force's RFC 3261: Session Initiation Protocol, which is incorporated herein by reference in its entirety. SIP messages may be used to deliver state information to the presence server 20 and well as deliver presence information to the subscriber entities 18. Additional presence system information may be found in The Internet Engineering Task Force's "RFC 3903: Session Initiation Protocol (SIP) Extension for Event State Publication," and "RFC 3863: Presence Information Data Format (PIDF)," which are incorporated herein by reference in their entireties.

Figure 7:
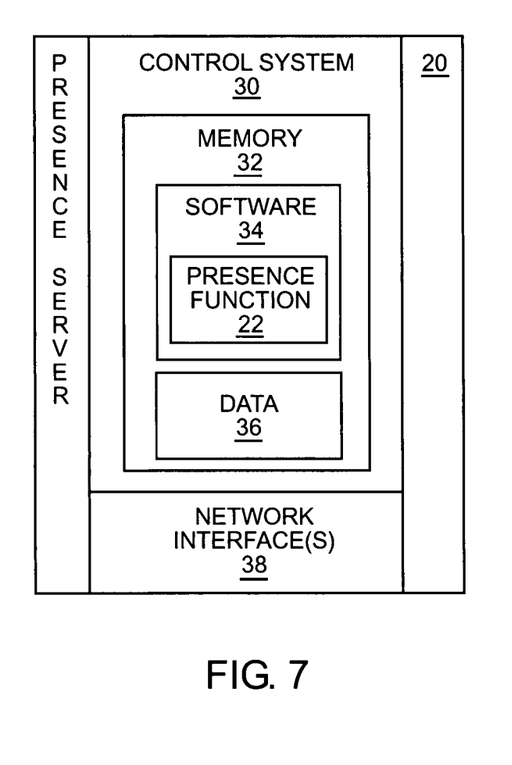
FIG. 7 is a block representation of a presence server according to one embodiment of the present invention.

With reference to FIG. 7, a block representation of a presence server 20 is illustrated as having a control system 30 with sufficient memory 32 for the requisite software 34 and data 36 to operate as described above. The presence function 22 may be implemented in the software 34. The control system 30 may also be associated with one or more network interfaces 38 to facilitate communications with the various monitored entities 14 and subscriber entities 18, as well as any other network entity.

Figure 8:
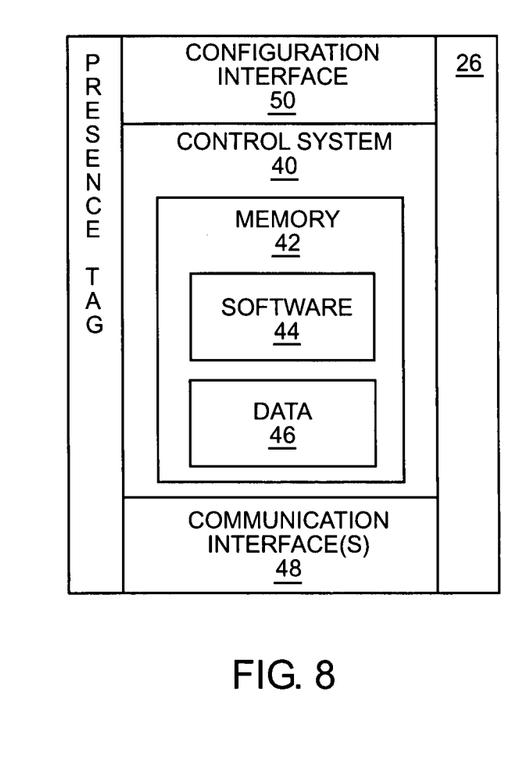
FIG. 8 is a block representation of a presence tag according to one embodiment of the present invention.

With reference to FIG. 8, a block representation of a presence tag 26 is illustrated. The presence tag 26 may take on any number of embodiments as noted above. In most of these embodiments, the presence tag 26 will include some form of a control system 40 having sufficient memory 42 for the requisite software (or firmware) 44 and data 46 to operate as described above. The control system 40 may also be associated with one or more communication interfaces 48 to facilitate communications with various mobile terminals 28. Such communications may be active or passive wherein the presence tag 26 can operate under its own power to transmit tag information or derive power from an interrogation signal from a mobile terminal 28 to transmit the tag information. Depending on the configuration of the presence tag 26, a configuration interface 50 may be provided to load the tag information. The tag information may also be loaded via the communication interface 48 by the mobile terminal 28 or other compatible device.

Figure 9:
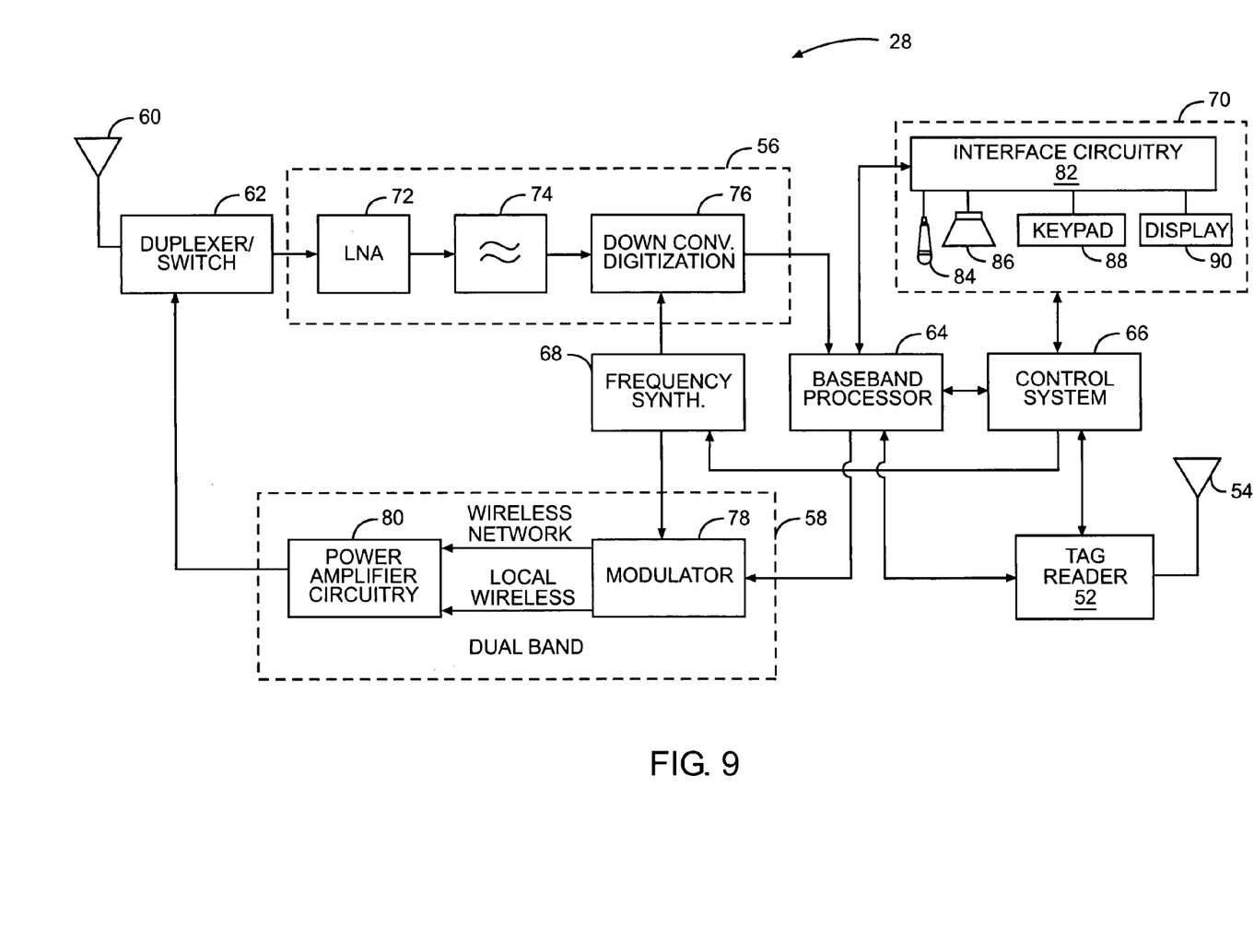
FIG. 9 is a block representation of a mobile terminal according to one embodiment of the present invention.

The basic architecture of the mobile terminal 28 is represented in FIG. 9. In the illustrated embodiment, a tag reader 52 and associated antenna 54 may be added to the normal electronics required by the mobile terminal 28. The tag reader 52 may include the requisite communication electronics to communicate with passive presence tags 26, active presence tags 26, or both. Alternately, the mobile terminal 28 may be configured to use portions of the existing communication circuitry to facilitate local wireless communications with active or passive presence tags 26.

In either embodiment, the mobile terminal 28 may include a receiver front end 56, a radio frequency transmitter section 58, an antenna 60, a duplexer or switch 62, a baseband processor 64, a control system 66, a frequency synthesizer 68, and an interface 70. The receiver front end 56 receives information bearing radio frequency signals from one or more remote transmitters provided by a base station. A low noise amplifier 72 amplifies the signal. A filter circuit 74 minimizes broadband interference in the received signal, while downconversion and digitization circuitry 76 downconverts the filtered, received signal to an intermediate or baseband frequency signal, which is then digitized into one or more digital streams. The receiver front end 56 typically uses one or more mixing frequencies generated by the frequency synthesizer 68. The baseband processor 64 processes the digitized received signal to extract the information or data bits conveyed in the received signal. This processing typically comprises demodulation, decoding, and error correction operations. As such, the baseband processor 64 is generally implemented in one or more digital signal processors (DSPs).

On the transmit side, the baseband processor 64 receives digitized data, which may represent voice, data, or control information, from the control system 66, which it encodes for transmission. The encoded data is output to the transmitter 58, where it is used by a modulator 78 to modulate a carrier signal that is at a desired transmit frequency. Power amplifier circuitry 80 amplifies the modulated carrier signal to a level appropriate for transmission, and delivers the amplified and modulated carrier signal to the antenna 60 through the duplexer or switch 62.

As noted above, the mobile terminal 28 may be able to communicate with the presence tag 26 as well as with a wireless or cellular network. Accordingly, the receiver front end 56, baseband processor 64, and radio frequency transmitter section 58 cooperate to provide either a cellular interface for the wireless network or a local access interface for the presence tag 26. The radio frequency transmitter section 58 may be configured to transmit signals and information to the presence tag 26. These functions may be implemented using redundant circuitry, or by configuring common circuitry to operate in different modes. The configuration of the mobile terminal 28 will be dictated by economics and designer choice. Alternately, the mobile terminal 28 could have both the local wireless interface and the wireless network interface in operation at the same time and select one of the two for communication at any given time as needed.

A user may interact with the mobile terminal 28 via the interface 70, which may include interface circuitry 82 associated with a microphone 84, a speaker 86, a keypad 88, and a display 90. The interface circuitry 82 typically includes analog-to-digital converters, digital-to-analog converters, amplifiers, and the like. Additionally, it may include a voice encoder/decoder, in which case it may communicate directly with the baseband processor 64. The microphone 84 will typically convert audio input, such as the user's voice, into an electrical signal, which is then digitized and passed directly or indirectly to the baseband processor 64. Audio information encoded in the received signal is recovered by the baseband processor 64, and converted by the interface circuitry 82 into an analog signal suitable for driving the speaker 86. The keypad 88 and display 90 enable the user to interact with the mobile terminal 28, input numbers to be dialed, address book information, or the like, as well as monitor call progress information.

Those skilled in the art will recognize improvements and modifications to the preferred embodiments of the present invention. All such improvements and modifications are considered within the scope of the concepts disclosed herein and the claims that follow.

What is claimed is:

1. A method comprising:
receiving tag information from a presence tag located at a location when a mobile unit retrieves the tag information as the mobile unit enters the location, wherein an ability to receive the tag information is indicative of:
a monitored person being relatively proximate to the location; and
a relative availability of the monitored person to engage in communications with a subscribing entity based on being relatively proximate to the location and the tag information, the subscribing entity being at a location other than the location of the presence tag where the subscribing entity subscribes to availability information of the monitored person; and
sending location-based state information based on the tag information to a presence server, which is adapted to evaluate the location-based state information to generate presence information indicating the relative availability of the monitored person for engaging in communications with the subscribing entity and deliver the presence information to the subscribing entity, wherein the presence server is provisioned to receive and evaluate the location-based state information based on a profile associated with the monitored person.

2. The method of claim 1 further comprising establishing communication sessions with other communication terminals.

3. The method of claim 1 wherein the location-based state information comprises the tag information.

4. The method of claim 1 further comprising determining a location-based state based on the tag information.

5. The method of claim 1 wherein the tag information is a tag identification.

6. The method of claim 1 wherein the tag information identifies a particular location or a type of location associated with the location.

7. The method of claim 1 wherein the presence tag transmits the presence information upon receiving a signal, and further comprising sending the signal in order to receive the tag information.

8. The method of claim 1 wherein the presence tag systematically transmits the tag information.

9. The method of claim 1 wherein the presence information bears on a relative availability for communications of the monitored person while the monitored person is relatively proximate to the location.

10. A method comprising:
receiving state information associated with a monitored person from a plurality of monitored entities, including a mobile terminal associated with the monitored person, the state information comprising location-based state information based on tag information retrieved by the mobile terminal from a presence tag at a location, wherein an ability to receive the tag information is indicative of:
a monitored person being relatively proximate to the location; and
a relative availability of the monitored person to engage in communications with a subscribing entity based on being relatively proximate to the location and the tag information, the subscribing entity being at a location other than the location of the presence tag where the subscribing entity subscribes to availability information of the monitored person;
evaluating the state information, including the location-based state information, to generate presence information indicating a relative availability of the monitored person for receiving communications from a subscribing entity; and
delivering the presence information to the subscribing entity, wherein the state information is received and evaluated based on a profile associated with the monitored person.

11. The method of claim 10 wherein the location-based state information comprises the tag information and generating the presence information comprises determining a presence state based on the location associated with the tag information.

12. The method of claim 10 wherein the presence information bears on a relative availability for communications of the monitored person while the monitored person is relatively proximate to the location.

13. A mobile terminal comprising:
a communication interface adapted to facilitate communications with a presence tag and a communication network; and
a control system associated with the communication interface and adapted to:
receive tag information from the presence tag located at a location, wherein an ability to receive the tag information is indicative of:
a monitored person being relatively proximate to the location; and
a relative availability of the monitored person to engage in communications with a subscribing entity based on being relatively proximate to the location and the tag information, the subscribing entity being at a location other than the location of the presence tag where the subscribing entity subscribes to availability information of the monitored person; and
send location-based state information based on the tag information to a presence server, which is adapted to evaluate the location-based state information to generate presence information indicating a relative availability of the monitored person for receiving communications from a subscribing entity and deliver the presence information to the subscribing entity, wherein the presence server is provisioned to receive and evaluate the location-based state information based on a profile associated with the monitored person.

14. The mobile terminal of claim 13 wherein the control system is further adapted to establish communication sessions with other communication terminals.

15. The mobile terminal of claim 13 wherein the location-based state information comprises the tag information.

16. The mobile terminal of claim 13 wherein the control system is further adapted to determine a location-based state based on the tag information.

17. The mobile terminal of claim 13 wherein the tag information is a tag identification.

18. The mobile terminal of claim 13 wherein the tag information identifies a particular location or a type of location associated with the location.

19. The mobile terminal of claim 13 wherein the presence tag transmits the presence information upon receiving a signal, and further comprising sending the signal in order to receive the tag information.

20. The mobile terminal of claim 13 wherein the presence tag systematically transmits the tag information.

21. The mobile terminal of claim 13 wherein the presence information bears on a relative availability for communications of the monitored person while the monitored person is relatively proximate to the location.

22. A presence server comprising:
a communication interface; and
a control system associated with the communication interface and adapted to:
receive state information associated with a monitored person from a plurality of monitored entities, including a mobile terminal associated with the monitored person, the state information comprising location-based state information based on tag information retrieved by the mobile terminal from a presence tag at a location, wherein an ability to receive the tag information is indicative of:
a monitored person being relatively proximate to the location; and
a relative availability of the monitored person to engage in communications with a subscribing entity based on being relatively proximate to the location and the tag information, the subscribing entity being at a location other than the location of the presence tag where the subscribing entity subscribes to availability information of the monitored person;
evaluate the state information, including the location-based state information to generate presence information indicating a relative availability of the monitored person for receiving communications from a subscribing entity; and
deliver the presence information to the subscribing entity, wherein the presence server is provisioned to receive and evaluate the state information based on a profile associated with the monitored person.

23. The presence server of claim 22 wherein the location-based state information comprises the tag information, and generating the presence information comprises determining a presence state based on the location associated with the tag information.

24. The presence server of claim 22 wherein the presence information bears on a relative availability for communications of the monitored person while the monitored person is relatively proximate to the location.

* * * * *